Nov. 14, 1967   J. MEDNEY   3,352,577
COUPLING ARRANGEMENT FOR FILAMENT REINFORCED
THERMOSETTING RESIN TUBULAR MEMBERS
Filed June 27, 1967

INVENTOR.
JONAS MEDNEY
BY Sherman H. Barber
his Attorney

United States Patent Office 3,352,577
Patented Nov. 14, 1967

3,352,577
COUPLING ARRANGEMENT FOR FILAMENT REINFORCED THERMOSETTING RESIN TUBULAR MEMBERS
Jonas Medney, Oceanside, N.Y., assignor to Koppers Company, Inc., a corporation of Delaware
Filed June 27, 1967, Ser. No. 649,215
3 Claims. (Cl. 285—246)

ABSTRACT OF THE DISCLOSURE

A coupling arrangement for connecting together tubular members of filament reinforced thermosetting resin is disclosed. The coupling arrangement is capable of withstanding severe internal stresses without failure of the coupling joint.

Cross reference to related applications

This application is a continuation-in-part of application Ser. No. 544,619 filed Apr. 22, 1966, and now abandoned.

Background of the invention

The present invention relates to coupling arrangements and, more particularly, to arrangement for coupling together filament wound thermosetting resin tubular members.

While many improvement have been made in filament wound thermosetting resin tubular structures, there is still no entirely satisfactory way to axially join together tubular structures such as thermosetting resin pipes and rocket motor casings. One way that is disclosed in the prior art is to develop and build up intricate flanges on the end of each length of pipe or rocket motor case, but this necessarily limits the applicability of the pipe to uses for pipes of prescribed lengths. If, for example, such pipe had to be cut in the field to some intermediary length, there would be no successful way of joining this cut lengths of pipe to other lengths of pipe. Another way that is found in the prior art is to adhesively bond flanges onto the ends of lengths of pipe, but such procedures have not produce a satisfactory product, one that is adapted for high pressure work; nor are such procedures suitable for joining lengths of thermosetting resin pipes in the field.

Summary of the invention

According to the present invention, a first frusto-conical annular member is adhesively secured in the flared end of a first thermosetting resin tubular member; a second frusto-conical annular member is adhesively secured in the flared end of a second thermosetting resin tubular member disposed in axial juxtaposed relation to the first tubular member; outer annular members are adhesively secured to the flared end portions of the first and second tubular members; and means is provided to engage both outer annular members and draw the juxtaposed ends of the tubular members into an abutting relation. In a first modification of the invention, resilient annular members are disposed between the first and second frusto-conical members and the flared ends of the first and second tubular members. In a second modification of the invention, a resilient annular member is disposed between the juxtaposed flared ends of the first and second resin tubular members.

Detail description

Figure 1:
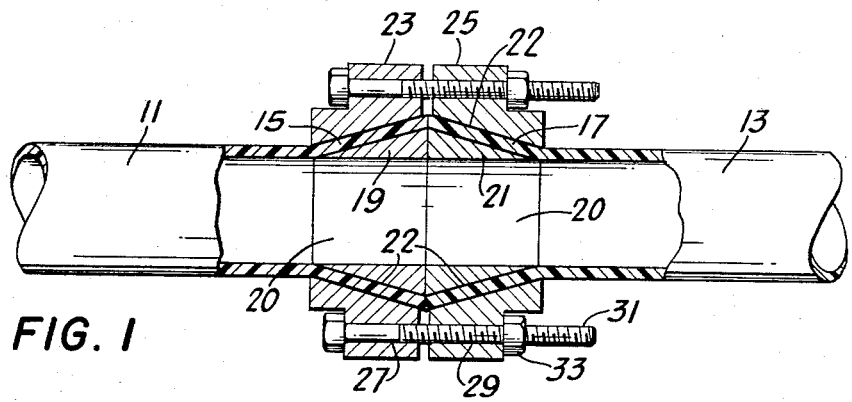
FIG. 1 is a view, partly in section, of two thermosetting resin tubular members coupled together in accordance with one embodiment of the invention.

Referring to FIG. 1, two lengths of glass filament wound thermosetting resin tubular members or pipes 11, 13 are shown in juxtaposed coaxial relation. Such pipes are commercially marketed, for example, under the trademark Hystran and are available from Lamtex Industries, Farmingdale, N.Y. Such pipes are available in various sizes and lengths and the pipe has plain ends. The end of each tubular member 11, 13 is prepared (in the manner described hereinafter) to provide a flared end portion 15, 17 and a frusto-concial annular member 19, 21 is disposed in each flared end portion. Each annular member 19, 21 is preferably stainless steel. The included angle of taper of the outer walls may be in the range of 3° to 20°; through, for most applications the angle of taper should not exceed 15° and, preferably the included angle of the taper is less than 10°. However, the minimum angle for the purpose of this invention is 3°.

To flare the end portions 15, 17 of the pipes 11, 13 annular frusto-conical members 19, 21, are forced into the plain ends of the pipes 11, 13. This may be accomplished in a number of ways such as by using a press mechanism if such is available, by using a hammer, or in any other convenient manner.

An epoxy type adhesive 22 is first applied to one or both of the matching surfaces of the flared end portions 15, 17 and the annular members 19, 21, which form a faying surface therebetween, whereby the annular members are secured within the flared end portions 15, 17. The annular members 19, 21 have central bores 20 that are of the same diameter, preferably, as the inner diameter of the pipes 11, 13, so that no obstruction to the flow of fluids is raised within the pipes when they are coupled together.

Surrounding and contiguous with the outer surface of the respective flared end portions 15, 17 are annular collar-like members 23, 25 that are also made of stainless steel, preferably, though other suitable metals may be used if preferred. Each collar-like member 23, 25 has a tapering hole therein with a wall that closely fits the outer surface of the flared end portions 15, 17. The collar-like members 15, 17 are also adhesively secured to the flared end portions by means of an epoxy-type adhesive applied to the faying surface between the collar-like members and the flared end portions in the same manner as described previously.

Each annular collar-like member 23, 25 has a plurality of spaced apart holes 27, 29, and bolts 31 and nuts 33 threaded on the bolts are used to draw together and maintain the pipes 11, 13 in a coupled arrangement. In practice it may be desirable, depending upon the service or use to which the pipe members are put, to insert a sealant (not shown) between the abutting surfaces of the ends of the pipes 11, 13 and the inner conical members 19, 21. Such a sealant may be an epoxy adhesive or a resilient annular member like a rubber gasket or the like.

Figure 2:
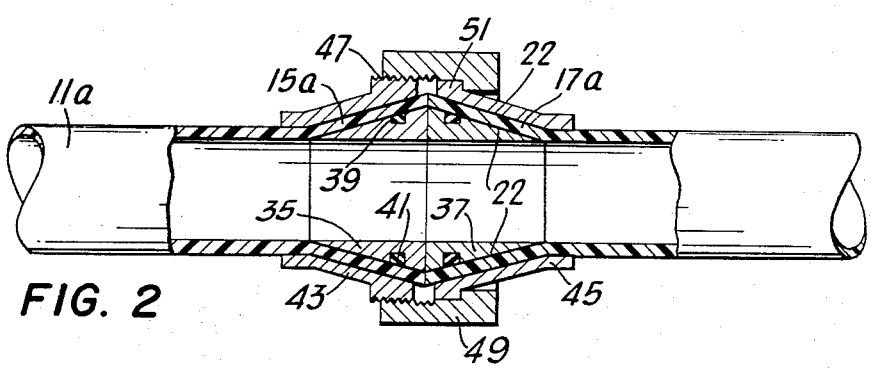
FIG. 2 illustrates a first modification of the coupling arrangement of FIG. 1.

In FIG. 2, frusto-conical annular metal members 35, 37 having an annular groove 39 and a resilient annular member 41, such as a common O-ring, in each groove, are adhesively secured in the flared end portions 15a, 17a of the tubular members 11a, 13a. As described hereinbefore, the annular members 35, 37 may be driven into the plain ends of pipes to form the flared end portions and an epoxy-type resin may be used to adhesively secure the annular members 35, 37 in the flared end portions. Annular collar-like metal members 43, 45 are secured adhesively to the outer surfaces of the flared end portions 15a, 17a by means of an epoxy like resin. In this instance, however, one annular collar-like member 43 has threads 47 on the outer surface that mate with a threaded slip collar 49 disposed around and in contact with an annular protrusion 51 on the collar-like member 45. Thus, when the tubular members 11a, 13a are arranged in coaxial juxtaposed relation and when the slip collar threadedly engages the collarlike member 43, the members 11a, 13a may be coupled by rotating the slip collar 49 to draw together the members 11a, 13a into end abutting relation. As mentioned previously, depending on the use or service to which the coupled members 11a, 13a are put, a sealant such as a resilient gasket, or an epoxy adhesive, or other suitable sealant may be disposed between the abutting surfaces of the members 11a, 13a and members 35, 37.

Figure 3:
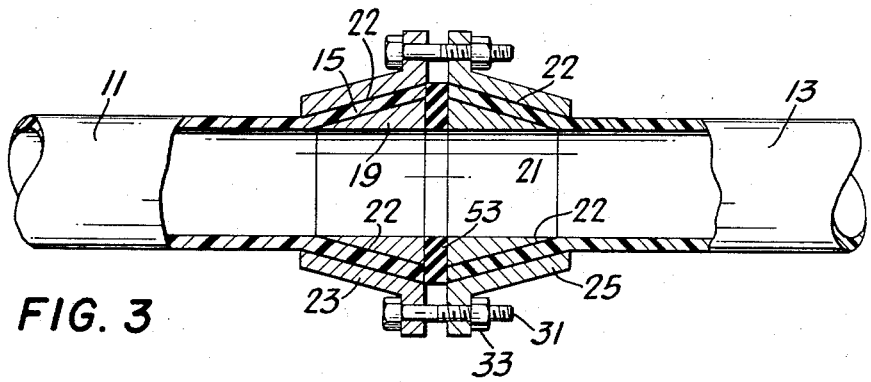
FIG. 3 illustrates a second modification of the coupling arrangement of FIG. 1.

FIG. 3 illustrates a second modification of the coupling arrangement of FIG. 1 wherein a resilient gasket 53 is disposed between opposed flared end portions 15, 17 and opposed ends of the annular members 19, 21. Otherwise, the coupling arrangement of FIG. 3 is the same as that of FIG. 1 and need not be further described.

In one application, two half-portions of a pressure vessel were fabricated by winding resin impregnated glass filaments on a cylindrical mandrel to form spherical shaped ended hollow members. The two portions of the vessel were of the same size having a diameter of 5 inches inside and 5.26 inches outside (0.130 inch wall thickness). The open ends of the two half-portions of the vessel were fitted with annular frusto-conical steel members that were urged into the open ends to flare them, and they were secured therein with an epoxy adhesive. The included angle of the frusto-conical inner annular member was 7°14'. The flared ends were fitted with adhesively secured annular outer metal rings as shown in FIG. 2 and the two half-portions were coupled together. The assembled vessel was about 11½ inches long overall. A fitting was provided to admit fluid under pressure into the vessel, and the vessel withstood an internal pressure of 2000 p.s.i.g. without failure and without a permanent set or distortion beyond specified tolerances. The pressure was then gradually increased until at 4000 p.s.i.g. the domed end of one portion of the vessel ruptured. The connection between the two half-portions remained intact, however.

A second vessel of similar size was constructed, but no adhesive was used to secure the inner and outer rings to the fiber glass vessel portion. In this test, the connection failed by pulling apart together with a crushing of the glass and resin material of the flared wall of the vessels. The joint without adhesive bonding of the inner and outer rings failed because shear forces crushed the material and because hoop stresses (those forces that circumferentially stretch the inner and outer rings) deformed and stretched the inner and outer rings until the joint failed at a very low stress.

Calculations show that, without adhesive bonding of the frusto-conical inner annular members and without bonding of the outer collar-like members to the flared end portions, the hoop stress in the inner and outer annular members becomes great enough to cause the coupling joint to distort and the joint fails at a relatively low stress. Whereas, a coupling arrangement constructed according to the invention can absorb the very high hoop stresses and the shear forces acting on the adhesive without distortion of the joint. Such a coupling arrangement can withstand severe loads without failure of the joint itself. While in some applications it may be possible to use very heavy outer annular members that are not adhesively secured to the flared portion, as disclosed herein, nevertheless, excessively heavy outer members produce excessive compressive forces that crush the matrial of the flared end portion of the tubular members. This, then, is not a practical solution to the problem of joining together lengths of filament wound thermosetting resin tubular members, such as pipes and rocket motor casings. The couple arrangement disclosed herein, however, solve the problem in a satisfactory manner.

While the disclosure herein refers to pipes and rocket motor casings as representative of tubular members, it is to be understood that the disclosure is not limited to only these types of tubular members.

Although the invention has been described herein with a certain degree of particularity, it is understood that the present disclosure has been made only as an example and that the scope of the invention is defined by what is hereinafter claimed.

What is claimed is:
1. The combination comprising:
 (a) a first filament wound thermosetting resin tubular member having a flared one end;
 (b) a second filament wound thermosetting resin tubular member having a flared one end arranged coaxially in juxtaposition to the said flared one end of said first tubular member;
 (c) a first annular frusto-conical member disposed in said flared one end of said first tubular member;
 (d) an adhesive bonding said first annular frusto-conical member to said first tubular member;
 (e) a second annular frusto-conical member disposed in said flared one end of said second tubular member;
 (f) an adhesive bonding said second annular frusto-conical member to said second tubular member;
 (g) an outer first annular member surrounding contiguously the outer surface of said flared one end of said first tubular member;
 (h) an adhesive bonding said outer first annular member to said first tubular member;
 (i) an outer second annular member surrounding continguously the outer surface of said flared one end of said second tubular member;
 (j) an adhesive bonding said outer second annular member to said second tubular member;
 (k) means connecting said first outer annular member to said second outer annular member for moving the flared one end of said first tubular member into abutting relation with the flared one end of said second tubular member; and
 (l) a resilient annular ring disposed between the outer surface of said inner frusto-conical member and the inner surface of said flared one end of each of said first and second tubular members.
2. The combination of claim 1 wherein:
 (a) the included angle between the tapering walls of each said first and second annular frusto-conical members is in the range 3° to 20°.
3. The combination of claim 1 wherein:
 (a) said means connecting said first and second outer annular members are cooperative threaded members engaging said first and second annular members.

References Cited
UNITED STATES PATENTS

| | | | |
|---|---|---|---|
| 173,307 | 2/1876 | Leland | 285—246 |
| 2,775,471 | 12/1956 | Douglass | 285—332.3 |
| 2,843,153 | 7/1958 | Young | 285—364 X |
| 2,962,305 | 11/1960 | McCarthy et al. | 285—367 X |
| 3,228,096 | 1/1966 | Albro | 285—332.3 |

FOREIGN PATENTS

| | | | |
|---|---|---|---|
| 777,859 | 6/1957 | Great Britain | 285—246 |

CARL W. TOMLIN, *Primary Examiner.*
THOMAS F. CALLAGHAN, *Examiner.*